United States Patent
Kom et al.

(10) Patent No.: US 12,443,508 B1
(45) Date of Patent: Oct. 14, 2025

(54) METHOD AND SYSTEM OF OPTIMIZING THE PERFORMANCE OF A SECOND COMPUTER BY A FIRST COMPUTER

(71) Applicant: Core Scientific Operating Company, Bellevue, WA (US)

(72) Inventors: Lawrence Kom, Redmond, WA (US); Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 267 days.

(21) Appl. No.: 17/744,023

(22) Filed: May 13, 2022

Related U.S. Application Data

(60) Provisional application No. 63/187,995, filed on May 13, 2021.

(51) Int. Cl.
*G06F 11/34* (2006.01)
*G06Q 20/06* (2012.01)

(52) U.S. Cl.
CPC ...... *G06F 11/3495* (2013.01); *G06F 11/3409* (2013.01); *G06Q 20/065* (2013.01); *G06Q 2220/00* (2013.01); *H04L 2209/56* (2013.01)

(58) Field of Classification Search
CPC ............ G06F 11/3495; G06F 11/3409; G06Q 20/065; G06Q 2220/00; H04L 2209/56
See application file for complete search history.

(56) References Cited

U.S. PATENT DOCUMENTS

| | | | |
|---|---|---|---|
| 11,659,682 B2* | 5/2023 | Barbour | G06F 1/182 361/679.46 |
| 11,744,040 B2* | 8/2023 | Shao | H05K 7/20281 700/282 |
| 2009/0327689 A1* | 12/2009 | Lazar | G06F 11/3409 702/182 |
| 2020/0012579 A1* | 1/2020 | Anokhin | G06Q 20/02 |
| 2022/0197856 A1* | 6/2022 | Khasawneh | G06F 9/5011 |
| 2023/0289196 A1* | 9/2023 | Ma | G06F 9/44505 |

* cited by examiner

*Primary Examiner* — Kamal M Hossain
(74) *Attorney, Agent, or Firm* — Fishman Stewart PLLC

(57) ABSTRACT

A method of computer operation may include (a) providing a first computer and a second computer; (b) operating the second computer; (c) modifying settings of the second computer; (d) monitoring, via the first computer, changes to a plurality of operational parameters of the second computer after the settings are modified to identify a plurality of covariant parameters of the plurality of operational parameters; and/or (e) controlling, via the first computer, operation of the second computers according to the identified plurality of covariant parameters to increase computational efficiency of the second computer.

20 Claims, 3 Drawing Sheets

METHOD AND SYSTEM OF OPTIMIZING THE PERFORMANCE OF A SECOND COMPUTER BY A FIRST COMPUTER

CROSS-REFERENCE TO RELATED APPLICATION

This application claims the benefit of and priority to U.S. Provisional Patent Application Ser. No. 63/187,995, filed on May 13, 2021, the disclosure of which is hereby incorporated by reference in its entirety as though fully set forth herein

TECHNICAL FIELD

The present disclosure generally relates to computer systems and methods, including computer systems and methods that may, for example, be utilized in connection with cryptocurrency mining and cryptocurrency mining computers, which may be referred to as miners or cryptocurrency miners.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (e.g., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to add false information to the blockchain and/or to double spend a digital coin.

Cryptocurrency networks generally consist of many participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce but easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network typically operate computers called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGA), graphics processing units (GPUs), and accelerated processing unit (APUs).

Miners are often run for long periods of time at high frequencies that generate large amounts of heat. Even with cooling (e.g., high speed fans), the heat and constant operations can negatively impact the reliability and longevity of the components in the miner. ASIC miners, for example, often have large numbers of hashing chips (e.g., 100's) that are more likely to fail as temperatures rise.

Many participants in blockchain networks operate large numbers (e.g., 100's, 1000's or more) of different computers/miners (e.g., different generations of miners from one manufacturer or different manufacturers) concurrently. These large numbers of miners can be difficult to manage efficiently.

There is a desire for solutions/options that minimize or eliminate one or more challenges or shortcomings of computer systems and methods. The foregoing discussion is intended only to illustrate examples of the present field and is not a disavowal of scope.

SUMMARY

In example embodiments, a method of computer operation may include (a) providing a first computer and a second computer; (b) operating the second computer; (c) modifying settings of the second computer; (d) monitoring, via the first computer, changes to a plurality of operational parameters of the second computer after the settings are modified to identify a plurality of covariant parameters of the plurality of operational parameters; and/or (e) controlling, via the first computer, operation of the second computers according to the identified plurality of covariant parameters, such as to increase computational efficiency of the second computer.

With example embodiments, a computer system may include a first computer and a plurality of second computers in communication with the first computer. The plurality of second computers including a hashboard having a plurality of microchips and/or an electronic controller configured to control the hashboard and communicate with the first computer. The first computer may be configured to adjust settings of the plurality of second computers; monitor operation of the plurality of second computers; identify a plurality of connected parameters at least indirectly associated with the plurality of second computers; and/or control the plurality of second computers according to the plurality of connected parameters to increase computational efficiency of the plurality of second computers.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
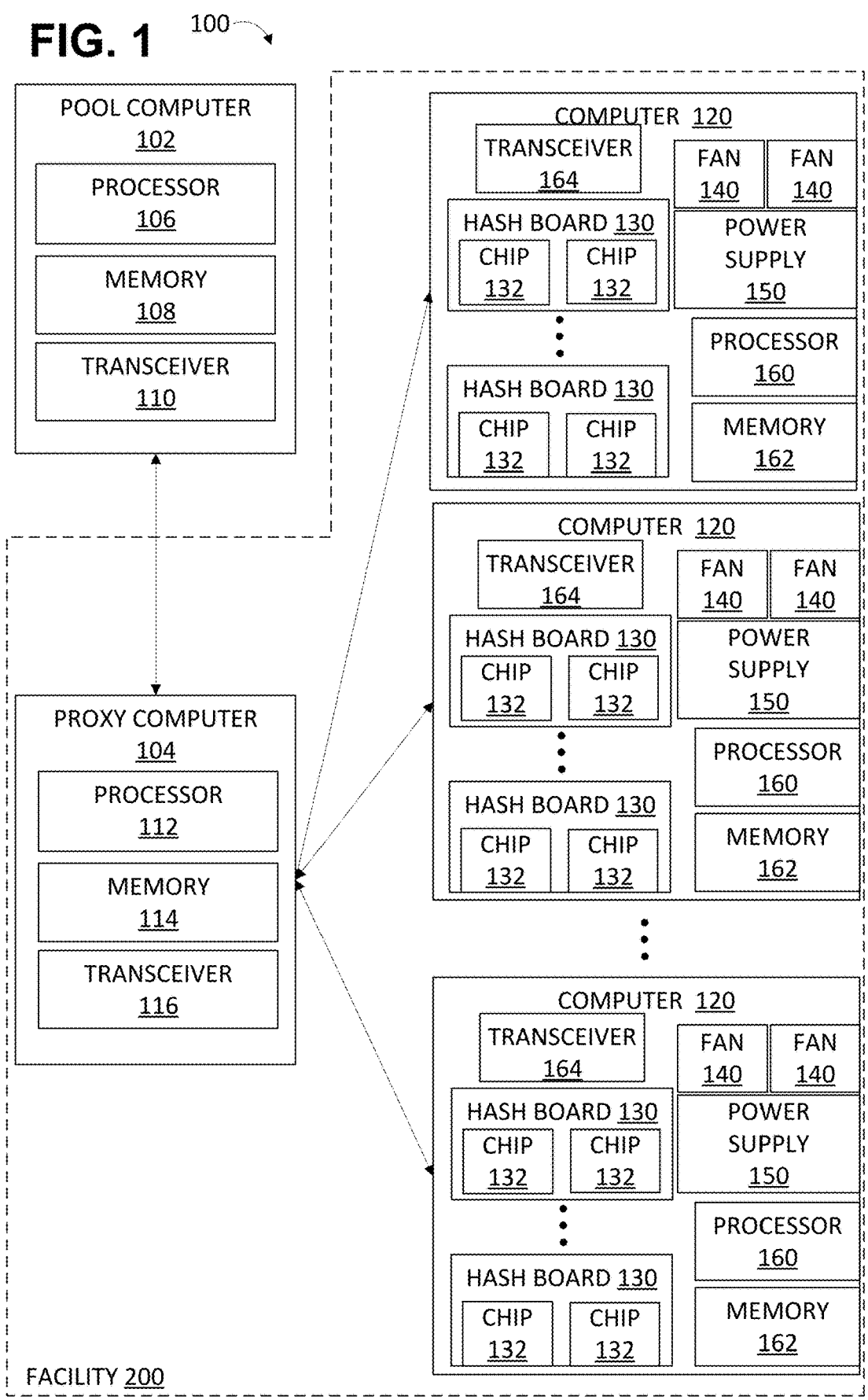
FIG. 1 is schematic view generally illustrating an example embodiment of a computing system according to an exemplary teaching of the present disclosure.

In embodiments, such as generally illustrated in FIG. 1, a computer system 100 may include a pool computer 102, a first computer 104, and/or one or more second computers 120 (e.g., miners, work computers, etc.). Pool computer 102 may include a processor 106, a memory 108, and/or a transceiver 110 (e.g., a network interface). Pool computer 102 may, in some circumstances be referred to as a pool manager. First computer 104 may include a processor 112, a memory 114, and/or a transceiver 116 (e.g., a network interface).

With embodiments, a computer 120 may be configured to perform compute tasks, such as compute tasks that may be utilized in connection with a blockchain and/or cryptocurrency mining. For example, a computer 120 may include one or more compute boards like hashboards 130. Processor 160, which may be configured as a controller, may handle communication external to computer 120 (e.g., via a transceiver 164), distribute compute tasks to hashboards 130, and/or receive results from computations from hashboards 130. Hashboards 130 may include one or more computing chips 132. Processor 160 may also be configured to control settings of computer 120 such as setting speeds of fans 140, chip voltage, and/or chip frequency. Some of these settings may be set by processor 160 by communicating with power supply 150 and some of these may be set by processor 160 by communicating with components directly on hashboards 130. Operating instructions for processor 160 may, for example, be stored on a memory 162. A power supply 150 may provide power to some or all components of a computer 120, such as a hashboard 130, a fan 140, a processor 160, a memory 162, and/or a transceiver 164.

In one example embodiment, computing chips 132 may include fixed-function application specific integrated circuits (ASICs) that are optimized for efficiently calculating hashes (e.g., SHA256), an operation that may be useful for mining cryptocurrencies like Bitcoin that are based on proof of work (POW). In other embodiments, computing chips 132 may, additionally or alternatively, include graphic processing units (GPUs) or field programmable gate arrays (FPGAs), and processor 160 may also be configured to provide programming information for these more configurable devices (e.g., OpenCL for GPUs and VHDL or Verilog for FPGAs). In some embodiments with FPGAs or GPUs, computers 120 may be configured to perform other types of compute operations, such as image processing, such as part of a machine learning neural network.

Computers 120 need not be of the same type, and in many embodiments may comprise groups of devices of different model types from different manufactures. Dissimilar models provided by disparate manufacturers may be controlled in different ways. Some components of computers 120 may include voltage regulators, buck controllers, and/or MOSFETs, among others, which may be controlled individually by first computer 104 (and/or a separate managing computer), such as via respective processors/controllers 160 that may receive instructions from first computer 104.

With illustrative embodiments, pool computer 102 may include and/or may distribute a plurality of compute tasks. Pool computer 102 may use a communication protocol that may standardize the manner in which information is distributed and/or received by pool computer 102. The communication protocol may, for example and without limitation, include a Stratum protocol.

Figure 2:
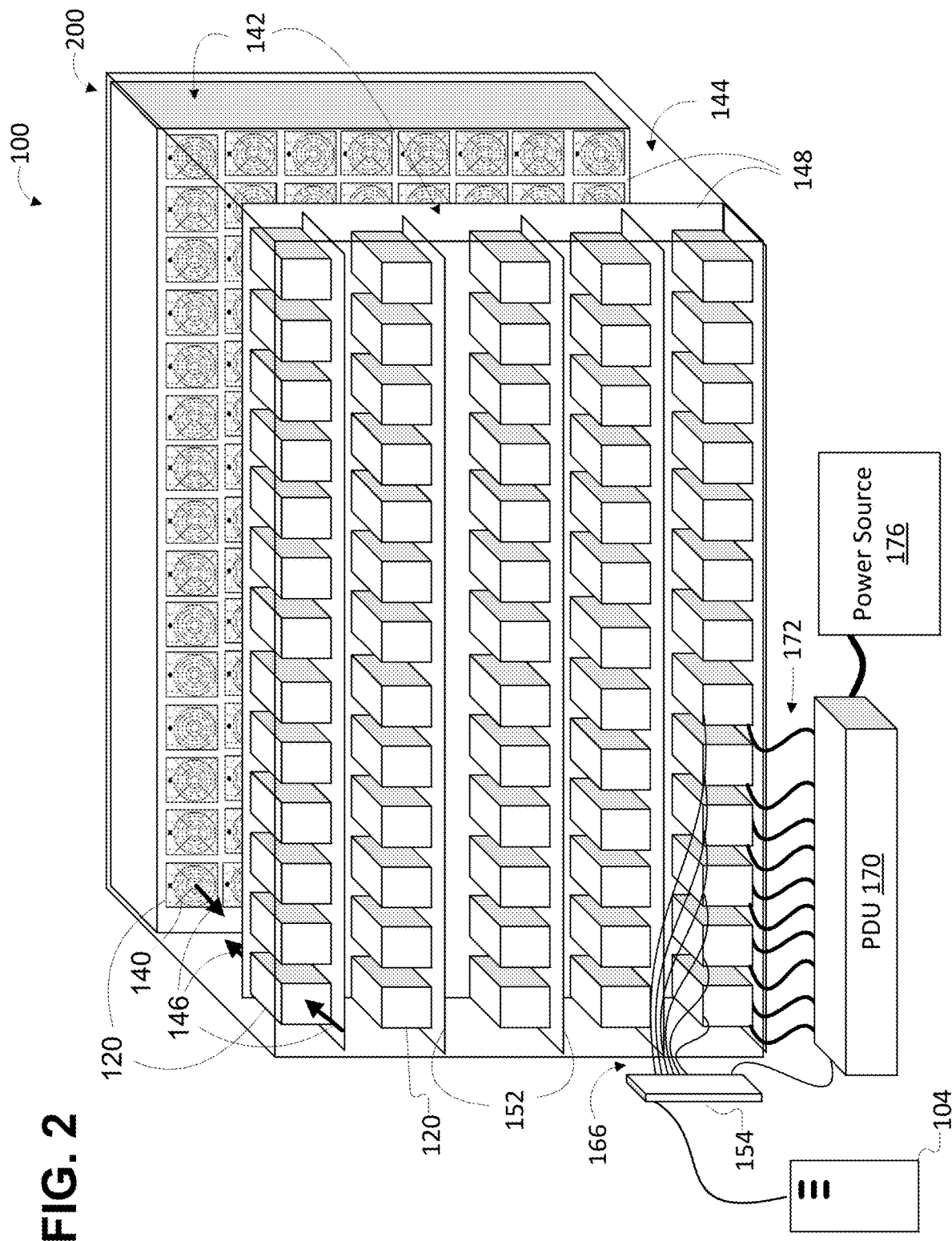
FIG. 2 is schematic view generally illustrating an example embodiment of a computing system according to an exemplary teaching of the present disclosure.

Turning now to FIG. 2, an illustration of an example embodiment of a system 100 for operating second computers 120, such as second computers 120 that may be disposed in a facility 200, is shown. In this embodiment, a plurality of second computers 120 (e.g., cryptocurrency miners, servers, Internet-of-Things (IoT) devices, network-enabled cameras, PCs, computing appliances, etc.) are positioned on a plurality of shelves 152 within racks 142. Second computers 120 may be affixed to and/or placed on shelves 152 and may be oriented in the same direction to improve cooling, such as shown in the illustration. For example, second computers 120 may have one or more fans 140 that are configured to draw in air (e.g., cool air) from one side of the rack 142 (often called a cold aisle) and exhaust hot air to the other side, such as into space 144, as shown by arrows 146. With second computers 120 exhausting hot air in the same direction, the hot exhaust air can be kept within the space 144 between the racks 142 (often called a hot aisle) and then exhausted in a controlled manner (e.g. via ceiling vents) to prevent the hot air from being drawn back into the second computers 120, which could reduce cooling efficiency. Racks 142 may have air barriers 148 to prevent the hot air from escaping from the hot aisle back to the cold aisle.

In this example embodiment, second computers 120 may be connected to a network 166 (e.g., via Ethernet cables) via a network switch 154. Other types of network connections are possible and contemplated, for example, wireless or fiber optic network interconnections may also be used. Network switch 154 may be connected to an internal network, for example a local area network, and/or an external network, e.g., the Internet. Second computers 120 may be configured to receive work or tasks to be performed and output results via the network. Second computers 120 may also be configured to receive control instructions via the network, for example instructions to reboot, power up, power down, hibernate, or enter low power or sleep mode. Second computers 120 may also be configured to report status data via the network, for example either in a push mode where second computers 120 is configured to periodically send status data, or in a pull mode where second computers 120 responds to status inquiry instructions received via the network.

Second computers 120 may receive work tasks and control instructions from a first/management computer 104. In this embodiment, first computer 104 may be connected to the same network 166 as second computers 120, e.g., via network switch 154. First computer 104 may be configured to execute a management application and may be configured to receive work items (e.g., from an external source, such as pool computer) and distribute the work items amongst the second computers 120. First computer 104 may also be configured to perform management functions such as tracking the power consumption of second computers 120 through the power distribution unit 170, such as for optimization, efficiency management, and/or billing purposes. First computer 104 may also be configured to assist users such as data center technicians in identifying the location of second computers 120 within a facility 200 (e.g., a datacenter, warehouse, storage container, etc.).

In this example embodiment, second computers 120 may be connected to power distribution unit 170 via one or more power cables 172. For example, in some embodiments, second computers 120 may each have one power cable 172, but, in other embodiments, they may have two or more power cables 172 to receive power from the power distribution unit 170. For example, if the second computer 120 is a high-power cryptocurrency miner, it may have two or more power cables to provide additional and/or redundant power from the power distribution unit 170. Power distribution unit 170 may for example receive power from power source 176, such as a transformer or directly from a power main or utility grid. Power distribution unit 170 may be controllable remotely (e.g., via ethernet, Wi-Fi, USB, Bluetooth, or other network protocol) and may be configured to receive instructions to power on or off a particular outlet or outlets, such as from and/or via first computer 104 (e.g., a management computer). Power distribution unit 170 may also be configured to report power usage data (e.g., current draw, voltage, power in watts, etc.) for its outlets. For example, power distribution unit 170 may be configured to respond to periodic power usage queries from first computer 104.

In example embodiments, first computer 104 and/or one or more second computers 120 may be disposed in a facility 200, such as a such as a data center, warehouse, and/or container, among others. Pool computer 102 may be disposed outside of facility 200. Pool computer 102, first computer 104, and/or second computer(s) 120 may be separate devices (e.g., in separate housings) that may be connected to communicate with each other, such as via one or more networks (e.g., wired networks, wireless networks, etc.).

With illustrative embodiments, it may be desirable to optimize operation of second computers 120. Optimization may include maximizing efficiency (e.g., computations or computation rate per unit power), maximizing hashrate, and/or maximizing lifetime value, among others. Operation of second computers 120 may depend on one or more of a variety of associated parameters that may relate to chips 132, hashboards 130, second computer 120, first computer 104, facility 200, infrastructure (e.g., a power grid), a pool for which second computer 120 is computing, and/or a blockchain corresponding to the pool. For example, parameters relating to chips 132 may include frequency, voltage, efficiency, temperature, and/or error rate. Parameters related to hashboards 130 may include frequency, efficiency, voltage, temperature, temperature of other hashboards 130 of second computer 120, location of hashboard 130 (e.g., in second computer 120), and/or error rate. Parameters relating to first computer 104 may include a temperature of or proximate processor 112 and/or a total hashrate of all second computers 120 (and/or hashboards 130 thereof) connected, at least indirectly, with first computer 104. Parameters relating to a facility 200 (and/or aisles thereof) may include internal temperature, external temperature (e.g., outside/outdoor temperature), internal pressure, and/or external pressure. Parameters relating to infrastructure may include electrical power balancing. Parameters relating to a pool may include accepted shares, rejected shares, invalid shares, payouts/rewards, and/or fees. Parameters relating to the blockchain may include net hashrate, block time, and/or reward amount. The foregoing are non-limiting examples of parameters. The parameters may be used directly, rates of change of the parameters may be used, and/or absolute values of the parameters may be used. For example and without limitation, first computer 104 may utilize one or more rates of change of temperature (e.g., chip temperature, hashboard temperature, second computer temperature, first computer temperature, aisle temperature, facility temperature, external temperature, etc.) for optimizing operation of second computer(s) 120.

In embodiments, first computer 104 may be configured to optimize operation of second computers 120 based on one or more of such parameters, such as via controlling and/or adjusting settings of second computers 120 according to the one or more parameters (and/or rates of change thereof), which may increase the efficiency (e.g., operational/computational efficiency) and/or performance of second computers 120.

With example embodiments, first computer 104 may be configured to operate a second computer 120, such as to establish a baseline of performance. First computer 104 may then adjust one or more settings of second computer 120 and monitor the effects on parameters associated with second computer 120. Settings of second computer 120 may, for example, include chip frequency, chip voltage, board voltage, board frequency, and/or fan speed, among others. First computer 104 may continue to adjust one or more settings and monitor the effects on associated parameters (e.g. first computer 104 may iterate setting adjustments), such as to identify a plurality of connected parameters. Connected parameters may, for example and without limitation, include covariant parameters and/or interdependent parameters. In some circumstances, connected parameters may tend to increase or decrease together or may tend to increase or decrease in opposite directions, such as the same rate or different rates. Identifying such connected parameters and adjusting settings accordingly may allow for more efficient operation of second computer 120. In contrast, if a setting is adjusted in light of a first parameter, with the intent of improving efficiency, but the setting adjustment is made without considering the connected/covariant parameters of the first parameter, the setting adjustment may have unintended effects that may limit efficiency increases or even result in decreased efficiency.

In some example embodiments, first computer 104 may adjust settings in groups. For example, first computer 104 may generate a plurality of groups of settings and apply the group of settings to a second computer 120 and/or components thereof. In some circumstances, first computer 104 may, for example, sequentially apply a number of different groups to a first hashboard 130 and monitor the effects of each group, and apply the number of different groups to any additional hashboards 130 and monitor the effects of each group.

In an example embodiment, first computer 104 may conduct an initial or pre-test by monitoring the effects of the initial settings of computer 120, such as to benchmark performance of second computers 120, respective hashboards 130 of second computers 120, and/or respective chips 132 of hashboards 130. In some circumstances, chips 132 may be created/manufactured from different portions of a silicon wafer, which may provide chips 132 with at least marginally different performance characteristics that may be affected differently, at least to some degree, by various parameters. Benchmarking performance of individual chips 132 of hashboards 130 may facilitate/allow for first computer 104 compensating for differences between chips 132.

In one example embodiment, adjusting settings may include first computer 104 iterating through groups (e.g., six groups) of settings for a first hashboard 130 while monitoring the effects of each group on various parameters (e.g., at one or more levels, such as a chip level, a board level, a second computer level, a facility level, a pool level, and/or a blockchain level, among others), iterate through the six groups of settings for a second hashboard 130 while monitoring the effects of each group (e.g., at one or more levels), iterate through the six groups of setting for a third hashboard 130 while monitoring the effects of each group (e.g., at one or more levels), determine a respective optimal group for each hashboard 130 and/or each chip 132, apply the optimal groups (which may or may not be the same) to the hashboards 130 and/or chips 132, and/or conduct a post-test by monitoring the effects of the optimized settings for hashboards 130 of computer 120 (e.g., 20 tests). Six groups and three hashboards 130 are provided as an example only and other numbers of groups and hashboards 130 may be used. First computer 104 may store information about the monitored effects (e.g., values and/or changes in parameters) of groups of settings, such as in a memory 114. First computer 104 may, for example, utilize the stored information to identify connected parameters, such as covariant parameters.

In example embodiments, first computer 104 may be configured to identify correlations in settings for second computers 120 and the resulting performance of second computers 120 (or the facility as a whole). These correlations may be identified from the pre-test data, from data collected during normal operation of second computers 120, or a combination thereof. For example, a Pearson's Correlation Coefficient (PCC) or Maximal Information Coefficient (MIC) may be calculated to determine covariance. In embodiments, first computer 104 may be configured to perform randomized control trials (RCT) by selectively varying correlated settings to further refine the identified correlations to a set of causations that can be used to optimize the performance of second computers 120 based on external factors such as current temperature and humidity, rates of change, predicted daily high and low temperature, and/or predicted humidity, among others.

Figure 3:
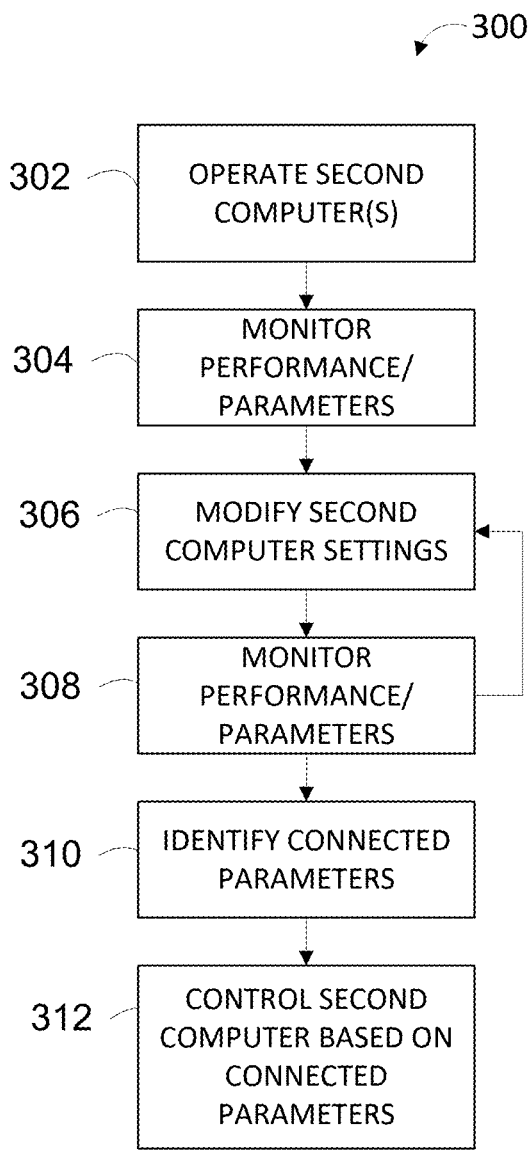
FIG. 3 is flow chart generally illustrating an example embodiment of a method of operating computers of the present disclosure.

Turning to FIG. 3, an example embodiment of a method 300 of computer operation is illustrated. Method 300 may include operating a plurality of second computers 120 (block 302). Operating second computers 120 may, for example, include computing hashes that may be utilized in connection with a blockchain, such as for cryptocurrency mining. Method 300 may include a first computer 104 monitoring the performance and/or parameters associated (at least indirectly) with second computer(s) 120 (block 304). Second computers 120 may include initial settings and block 304 may, for example, include benchmarking second computers 120, hashboards 130 of second computers 120, and/or chips 132 of hashboards 130. First computer 104 may store information from the monitoring/benchmarking, such as in a memory 114.

With example embodiments, method 300 may include first computer 104 modifying settings of second computer(s) 120 (block 306), such as of hashboards 130 and/or chips 132 (e.g., voltage, frequency, etc.). Modifying settings may include first computer 104 sending instructions or other information to second computers 120 to change the respective settings. Method 300 may include first computer 104 monitoring performance and/or parameters (block 308), such as the benchmarked parameters, of second computers 120 with the modified settings. With some embodiments, method 300 may include repeating blocks 306 and 308 with different settings or groups of settings. First computer 104 may store the monitored performance and/or parameters, such as in memory 114. In example embodiments, first computer 104 (or another computer) may identify a plurality of connected parameters (e.g., covariant parameters) based on the stored performance/parameter information (block 310). For example and without limitation, first computer 104 may apply machine learning to the performance/parameter information to identify covariant parameters. The connected parameters may be identified relative to (e.g., at a level of) the plurality of hashboards 130 of second computer 120, relative to a plurality of chips 132 of one or more hashboards 130, relative to an aisle of a facility 200 (e.g., for parameters up to and including aisle-related parameters), relative to a facility 200 (e.g., e.g., for parameters up to and including facility-related parameters), relative to a pool, and/or relative to a blockchain, among others.

In illustrative embodiments, method 300 may include controlling, such as via first computer 104, second computer(s) 120 based on the identified connected parameters (block 312). For example, first computer 104 may adjust certain settings (which may also be parameters) of second computer(s) 120 based on the effect the adjustments to those settings are expected to have on one or more parameters. First computer 104 may then operate second computer(s) 120 with the adjusted settings.

With some example embodiments, method 300 may include providing an additional second computer 120 and repeating some or all of blocks 304-312 for additional second computer 120. In examples, additional second computer 120 may replace (the original) second computer 120, include a maximum hash rate at least as great as the (original) second computer 120, and/or include a different hardware configuration (e.g., different types of hashboards 130 and/or chips 132). For example, method 300 may be utilized in connection with adding new second computers 120 and/or replacing existing second computers 120, and optimizing such new/replacement second computers 120.

In examples, a computing device/computer may include an electronic controller and/or include an electronic processor, such as a programmable microprocessor and/or microcontroller. In embodiments, a computing device/computer may include, for example, an application specific integrated circuit (ASIC). A computing device/computer may include a central processing unit (CPU), a memory (e.g., a non-transitory computer-readable storage medium), and/or an input/output (I/O) interface. A computing device/computer may be configured to perform various functions, including those described in greater detail herein, with appropriate programming instructions and/or code embodied in software, hardware, and/or other medium. In example embodiments, a computing device/computer may include a plurality of controllers. In illustrative embodiments, a computing device/computer may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of computer operation, the method comprising:
   (a) providing a first computer and a second computer including a plurality of hashboards;
   (b) operating the second computer, including executing, by the plurality of hashboards, computational operations for solving hash-based challenges as part of a blockchain-based proof-of-work algorithm;
   (c) modifying settings of the second computer;
   (d) monitoring, via the first computer, changes to a plurality of operational parameters of the second computer after the settings are modified to identify a plurality of covariant parameters of the plurality of operational parameters, wherein the plurality of covariant parameters includes one or more groups, each group comprising one or more operational parameters and corresponding one or more performance parameters; and
   (e) controlling, via the first computer, operation of the second computer according to the identified plurality of covariant parameters to increase computational efficiency of the second computer, wherein controlling includes refining the identified plurality of covariant parameters to a set of causations, the set of causations comprising confirmed cause-and-effect relationships between respective setting adjustments of the one or more operational parameters and resulting performance outcomes of the one or more performance parameters, identified by the first computer through controlled testing or analysis, and usable to optimize the performance of the second computer based on external factors;

wherein the settings of the second computer include a plurality of groups of settings; and wherein modification of the settings includes iterating through the plurality of groups of settings for the plurality of hashboards to determine a respective optimal group of settings from the plurality of groups of settings for each hashboard.

2. The method of claim 1, wherein each hashboard includes a plurality of computing chips.

3. The method of claim 2, wherein the plurality of covariant parameters are identified relative to the plurality of hashboards.

4. The method of claim 2, wherein the plurality of covariant parameters are identified relative to the second computer.

5. The method of claim 2, wherein the plurality of covariant parameters are identified relative to an aisle of a facility in which the second computer is disposed.

6. The method of claim 5, wherein the plurality of covariant parameters are identified relative to the facility.

7. The method of claim 2, including, while operating the second computer and before modifying the settings, benchmarking performance of the second computer.

8. The method of claim 7, wherein at least one of:
benchmarking includes benchmarking performance of the plurality of hashboards; and
benchmarking includes benchmarking performance of the plurality of computing chips.

9. The method of claim 2, wherein modifying settings includes modifying voltages provided to the plurality of hashboards.

10. The method of claim 2, wherein modifying settings include modifying operating frequencies of the plurality of computing chips of the plurality of hashboards.

11. The method of claim 1, including providing an additional second computer and repeating steps (b)-(e) for the additional second computer.

12. The method of claim 11, wherein the additional second computer (i) replaces the second computer, (ii) includes a maximum hashrate at least as great as the second computer, and (iii) has a different hardware configuration than the second computer.

13. The method of claim 1, wherein monitoring changes to the plurality of operational parameters of the second computer includes monitoring changes to the plurality of operational parameters at a chip level and a board level of the second computer.

14. A computer system, comprising:
a first computer; and
a plurality of second computers in communication with the first computer, the plurality of second computers each including:
a hashboard having a plurality of microchips; and
an electronic controller configured to control the hashboard and communicate with the first computer;
wherein the first computer is configured to:
adjust settings of the plurality of second computers;
monitor operation of the plurality of second computers;
identify a plurality of covariant parameters at least indirectly associated with the plurality of second computers, wherein the plurality of covariant parameters includes one or more groups, each group comprising one or more operational parameters and corresponding one or more performance parameters;
control the plurality of second computers according to the plurality of covariant parameters to increase computational efficiency of the plurality of second computers, wherein the control includes refining the identified plurality of covariant parameters to a set of causations, the set of causations comprising confirmed cause-and-effect relationships between respective setting adjustments of the one or more operational parameters and resulting performance outcomes of the one or more performance parameters, identified by the first computer through controlled testing or analysis, and usable to optimize the performance of the second computer based on external factors;
wherein the settings of the plurality of second computer include a plurality of groups of settings;
wherein adjusting the settings includes iterating through the plurality of groups of settings for each hashboard to determine a respective optimal group of settings from the plurality of groups of settings for each hashboard; and
wherein each hashboard is configured to execute computational operations for solving hash-based challenges as part of a blockchain-based proof-of-work algorithm.

15. The computer system of claim 14, wherein identifying the plurality of covariant parameters includes determining correlation coefficients between operational parameters of the second computer across multiple different settings to quantify the degree of dependent variation among the plurality of operational parameters.

16. The computer system of claim 14, wherein the first computer is configured to iteratively adjust settings and monitor operation to identify the plurality of covariant parameters.

17. The computer system of claim 16, wherein the plurality of second computers each include a plurality of hashboards.

18. The computer system of claim 17, wherein iteratively adjusting settings includes sequentially iteratively adjusting settings of each hashboard of the plurality of hashboards.

19. The computer system of claim 14, wherein the respective optimal group of settings determined for each hashboard is different.

20. The computer system of claim 18, wherein sequentially iteratively adjusting settings of each hashboard includes applying a common set of groups of setting adjustments to each hashboard.

* * * * *